Dec. 20, 1955 H. L. BOWDITCH 2,727,802
DETACHABLE PEN ARM UNIT FOR RECORDING INSTRUMENTS
Filed Aug. 30, 1952
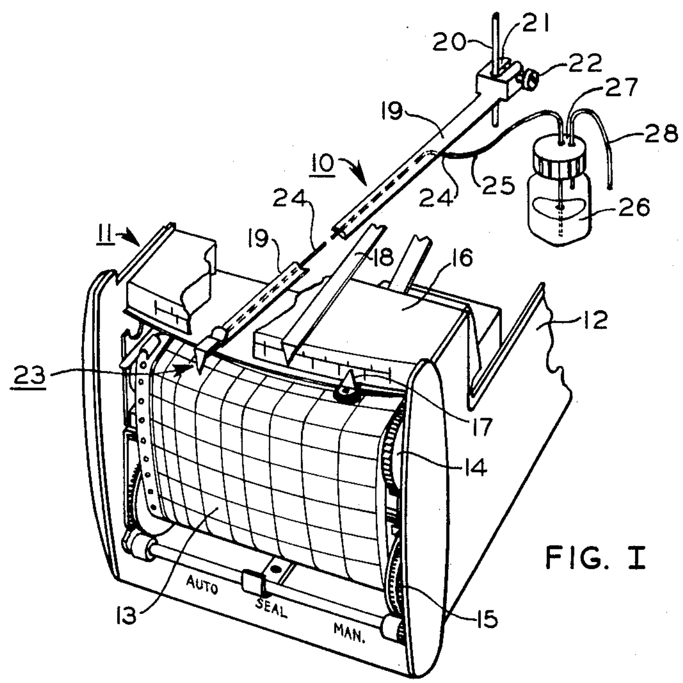
FIG. I
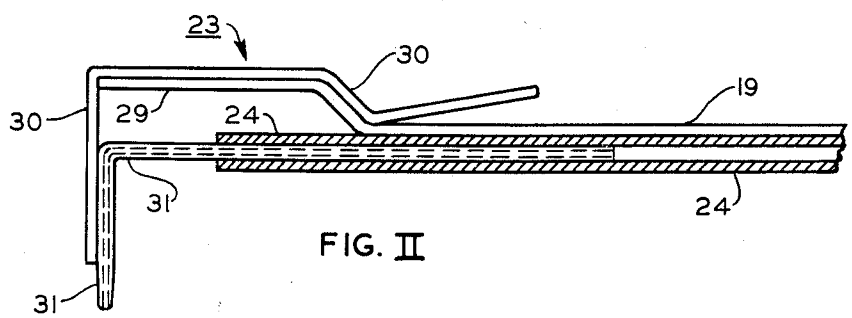
FIG. II
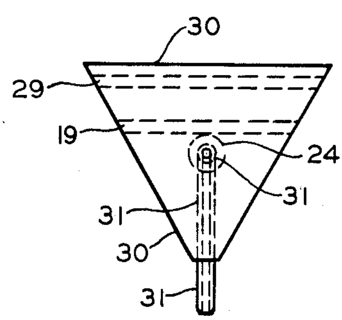
FIG. III
*INVENTOR.*
HOEL L. BOWDITCH
*BY*
Curtis, Morris + Safford
*ATTORNEYS*

United States Patent Office 2,727,802

Patented Dec. 20, 1955

2,727,802

DETACHABLE PEN ARM UNIT FOR RECORDING INSTRUMENTS

Hoel L. Bowditch, Foxboro, Mass., assignor to The Foxboro Company, Foxboro, Mass., a corporation of Massachusetts Application August 30, 1952, Serial No. 307,292

1 Claim. (Cl. 346—140)

This invention relates to recording instruments wherein a pen arm unit is driven in response to changes in a variable condition. In particular, this invention relates to a new and improved pen unit and pen arm unit for use in such instruments.

This invention, further, is concerned with a form of pen arm unit which comprises a driven pen arm or assembly with a pen thereon which is supplied with ink through a capillary tube connection to an ink supply container.

A problem in the use of such pen arm units is the necessity of pen removal for cleaning or substitution. Arrangements and structures for this purpose need to be simple and easy in operation, and yet they must be strong and positionally accurate in assembly. This problem and these requirements are felt to a greater degree than usual in instruments requiring extra long, lightweight and delicate pen arm units. This condition may exist in instruments wherein the desire to more efficiently use multi-instrument panel space has resulted in the reduction of the frontal face size of the instruments and a compensating increase in instument depth, with the pen arm units driven from the rear of the instrument.

It is an object of this invention to overcome this problem by providing a new and improved reservoir-fed pen unit and pen arm unit for use in a recording instrument.

Another object of this invention is to provide a detachable pen unit for use as part of a reservoir-fed pen arm unit.

Another object of this invention is to provide a snap-on detachable pen unit for use as a part of a reservoir-fed pen arm unit.

A further object of this invention is to provide a separable pen arm unit made up of an assembly of a pen and a support therefor and an assembly of a pen arm and an ink supply conduit.

These and other objects of this invention will be in part pointed out and will be in part obvious from the text and claims here presented and from the accompanying drawings, in which:

Figure I is a fragmentary perspective showing of a measuring instrument incorporating a pen arm unit embodying this invention;

Figure II is an enlarged side elevation of the pen assembly of the pen arm unit of Figure I, and Figure III is an end elevation of the pen assembly of Figure II.

Referring to Figure I, a pen arm unit 10 is shown in association with a recording instrument portion 11. The instrument portion 11 is contained in a housing 12 with a strip chart 13 mounted therein on rollers 14 and 15 to be driven in association with the pen arm unit 10 for recording measured values of a variable condition. This instrument is shown simply for the purpose of showing a typical application of the pen arm unit 10. The details of the instrument are therefore not shown. Any of the usual strip chart recording structures may be used for this purpose. However, the pen arm unit 10 is shown broken to indicate substantial length, greater than usual in recording instrument pen arms. This extra long pen arm unit is an indication that one application of the pen arm unit of this invention is its use in an instrument where the frontal face size is reduced by giving the instrument substantial depth. Desirable instrument design in such a case may dictate that the index arm units be driven from the rear of the instrument, thus requiring extra long, extra lightweight pen arm units.

The instrument portion 11 is shown with a double index scale block 16 mounted above the strip chart 13, and a control set point indicator 17 is arranged in association with one of the index scales on the block 16. Further, a pointer 18 is associated with the other index scale on the block 16. The position of the pointer 18 indicates the value of a factor that varies as an incident of the operation of the instrument, for example, valve position in a flow control arrangement.

The pen arm unit 10 has a driven base or elongated arm portion 19 which is secured to a rotatable shaft 20. The shaft 20 is driven by any suitable means, not shown, in response to changes in a variable condition. The driven shaft 20 is shown in a vertical position with the pen arm unit 10 movable in a horizontal plane thereby. The pen arm is generally in the form of a thin flat strip with one end secured to the shaft 20. The pen arm 19 is detachably secured to the shaft 20 by means of a constrictable slot 21 and a transverse screw 22 for binding the arm to the shaft by constricting the slot. The other recording end of the pen arm receives a pen unit 23. The pen arm 19 supports an ink conduit section 24, which is secured to the pen arm to provide a unitary structure therewith. The inner end of the ink conduit section 24 terminates adjacent the driven shaft 20 in a separable connection to a flexible ink supply pipe 25, leading to an ink supply container 26. The container 26 is an ink bottle with a removable cap 27, through which the ink supply pipe 25 extends, to terminate below the ink supply surface, in a capillary action supply. An air pressure compensating pipe 28 also extends through the ink supply container cap 27, with its outer end open to atmosphere and its inner end located within the container 26 but located above the surface of the ink supply.

The outer end of the ink conduit section 24, as will be explained hereinafter, is detachably assembled with the pen unit 23. As the pen unit 23 is moved over the surface of the strip chart 13, ink is drawn therefrom automatically as long as the supply lasts and as long as the end of the supply tube 25 remains below the surface of the ink supply.

The details of the pen unit 23 and its detachable assembly with the pen arm 19 are shown in Figures II and III. The pen arm 19 terminates in an upwardly offset parallel portion 29, and the ink conduit section 24 terminates adjacent to and short of, the outer end of the pen arm 19. The pen unit comprises a pen support 30 and a pen 31 fixed thereto. The pen support 30 is a flat stock, lightweight member which has a portion in nesting relation with the pen arm terminal portion 29. The pen support 30 has a right angle formation into which the pen arm terminal portion 29 extends in abutting relation with one arm of the right angle formation. The other arm of the right angle formation extends along the pen arm offset 29 and downwardly to the pen arm 19, still along and in engagement with the pen arm offset portion 29. The inner terminal end of the pen support 30 is bent upwardly to provide a finger hold to snap the pen support 30 off the pen arm terminal portion 29 to disassemble the pen unit 23 from the pen arm 19.

The pen 31 is in the form of a right angle tube with one arm extending downward parallel with and secured to the pen arm abutting portion of the pen support 30.

This is the terminal portion of the pen, and it extends downwardly beyond the end of the pen support so that the end of the pen is the only chart engaging portion of the pen arm unit. The other arm of the right angled pen extends rearwardly of the pen arm unit in parallel with the pen arm, and is in close fitting detachable and telescoping assembly relation with the ink conduit section 24.

The pen unit is assembled with the pen arm unit by inserting the pen tube 31 into the ink conduit 24 and thereafter snapping the pen support 30 over the pen arm terminal offset portion 29. The pen support 30 is held in nested relation with the pen arm offset 29 by the abutting relation of the pen arm and pen support in combination with the bracing effect of the pen tube 31 inserted in the ink conduit 24.

This invention, therefore, provides a novel reservoir fed pen arm structure, in which a lightweight pen arm is provided with a lightweight snap-on pen unit, and in which two separable assemblies are provided, namely the assembly of the pen and pen support, and the assembly of the pen arm and ink conduit section.

As many embodiments may be made in the above invention, and as many changes may be made in the embodiment above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

In a recording instrument, a driven member movable in response to changes in a variable condition, a pen assembly mounted on said driven member for movement therewith and comprising a pen arm unit and a pen unit detachably joined in predetermined, positively reproduceable location and position relation with each other, said pen arm unit comprising a pen arm with one end secured to said driven member and the other end formed as an offset terminal portion, and an ink supply conduit secured to said arm with one end adjacent said terminal portion of said arm and the other end detachably connected to an ink supply container, and said pen unit comprising an angled pen support with one leg thereof abutting on the end of said pen arm offset terminal portion in area contact therewith and the other leg thereof in snap-on nesting assembly with said pen arm offset terminal portion, and an angled pen within the angle of said pen support with one leg of said pen secured to said abutting leg of said pen support and the other leg of said pen detachably connected to said ink supply conduit with said pen and conduit connection providing a bracing effect in aid of said snap-on assembly, whereby location and position defining factors are established by the combination of: said area contact between said pen support and the end of said pen arm offset terminal portion; said snap-on nesting assembly; and said connection of said pen with said ink supply conduit; to provide said predetermined and positively reproducible location and position assembly relation between said pen arm unit and said pen unit.

References Cited in the file of this patent

UNITED STATES PATENTS

| | | |
|---|---|---|
| 1,648,227 | Heesch et al. | Nov. 8, 1927 |
| 1,849,084 | Hand | Mar. 15, 1932 |
| 2,392,487 | Lee | Jan. 8, 1946 |
| 2,626,201 | Young et al. | Jan. 20, 1953 |